United States Patent
Ishikawa

(10) Patent No.: US 7,325,212 B2
(45) Date of Patent: Jan. 29, 2008

(54) METHOD AND DEVICE FOR ELECTRONIC CIRCUIT DESIGNING, AND COMPUTER PRODUCT

(75) Inventor: Yoichiro Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/361,992

(22) Filed: Feb. 27, 2006

(65) Prior Publication Data

US 2006/0143581 A1    Jun. 29, 2006

Related U.S. Application Data

(63) Continuation of application No. PCT/JP03/14072, filed on Nov. 4, 2003.

(51) Int. Cl.
*G06F 17/50*    (2006.01)

(52) U.S. Cl. ........................ 716/6

(58) Field of Classification Search ............ 716/6
See application file for complete search history.

(56) References Cited

U.S. PATENT DOCUMENTS

| | | | |
|---|---|---|---|
| 6,353,917 B1 * | 3/2002 | Muddu et al. ............ | 716/6 |
| 6,637,014 B2 * | 10/2003 | Casavant ................ | 716/6 |
| 6,678,871 B2 * | 1/2004 | Takeyama et al. ........ | 716/6 |
| 6,772,403 B1 * | 8/2004 | Sasaki ................... | 716/6 |
| 7,043,708 B2 * | 5/2006 | Tetelbaum et al. ........ | 716/6 |
| 2001/0041970 A1 | 11/2001 | Fujimori et al. | |

FOREIGN PATENT DOCUMENTS

| | | |
|---|---|---|
| JP | 6-243197 | 9/1994 |
| JP | 8-297689 | 11/1996 |
| JP | 9-147009 | 6/1997 |
| JP | 2001-265831 | 9/2001 |
| JP | 2002-92069 | 3/2002 |
| JP | 2002-197135 | 7/2002 |
| JP | 2002-259481 | 9/2002 |
| JP | 2003-58594 | 2/2003 |
| JP | 2003-124326 | 4/2003 |
| JP | 2003-303217 | 10/2003 |

OTHER PUBLICATIONS

Noriyuki Ito et al., "Standard cell LSI Layout system: GigaGate", FUJITSU, Fujitsu Ltd., Nov. 10, 1999, vol. 50, No. 6, pp. 378-381.

* cited by examiner

*Primary Examiner*—Stacy Whitmore
(74) *Attorney, Agent, or Firm*—Staas & Halsey LLP

(57) ABSTRACT

Noise related to a part of electronic circuits that are to be designed is computed. If the computed noise exceeds a limiting value, parameters of the electronic circuits are modified by using a predetermined method (simple noise check) so that the noise is less than or equal to the limiting value. Signal transmission timing is analyzed for all the electronic circuits, and noise related to all the electronic circuits whose signal transmission timing is analyzed is computed. If the noise exceeds the limiting value, the simple noise check is executed.

21 Claims, 16 Drawing Sheets

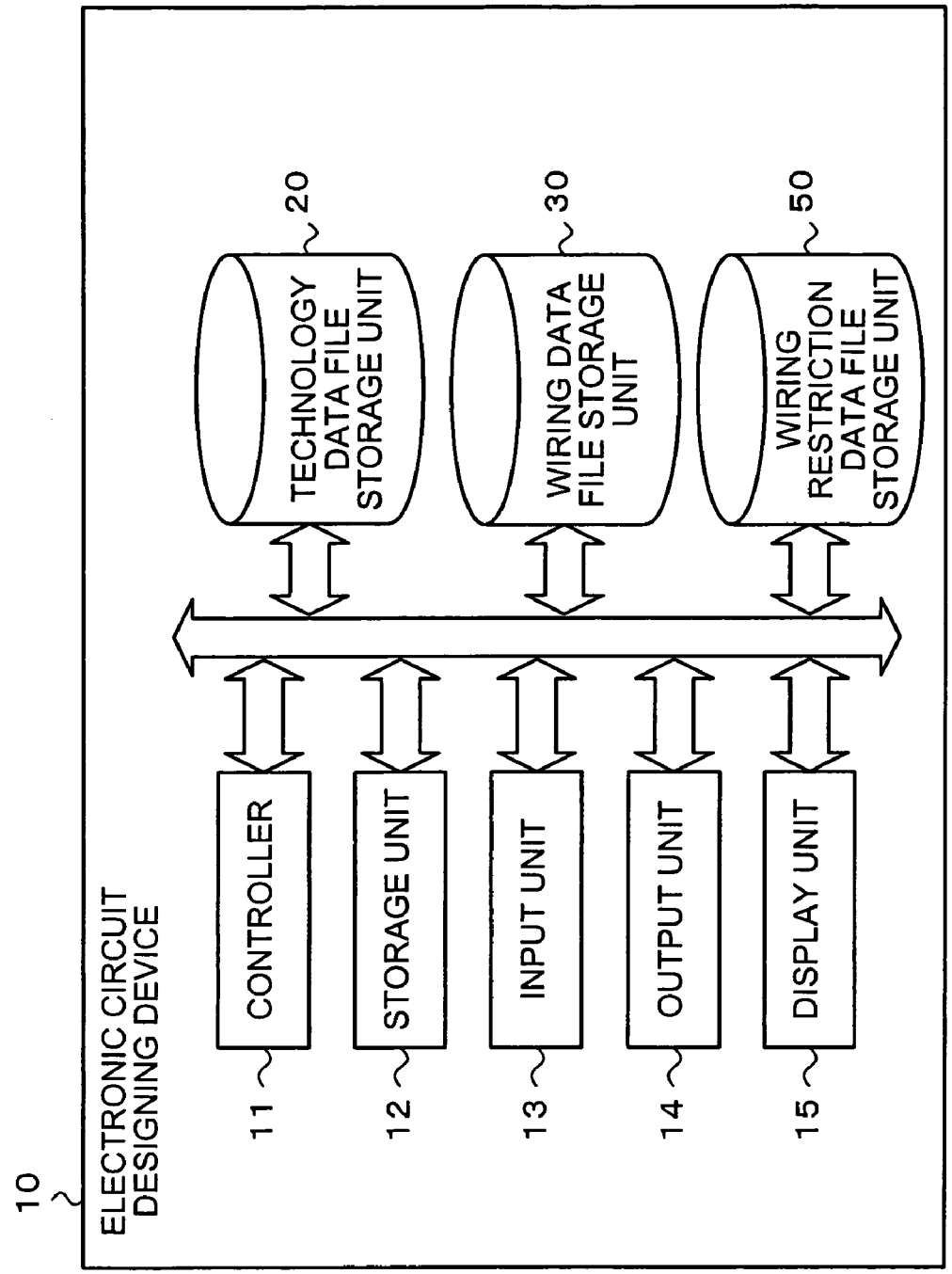

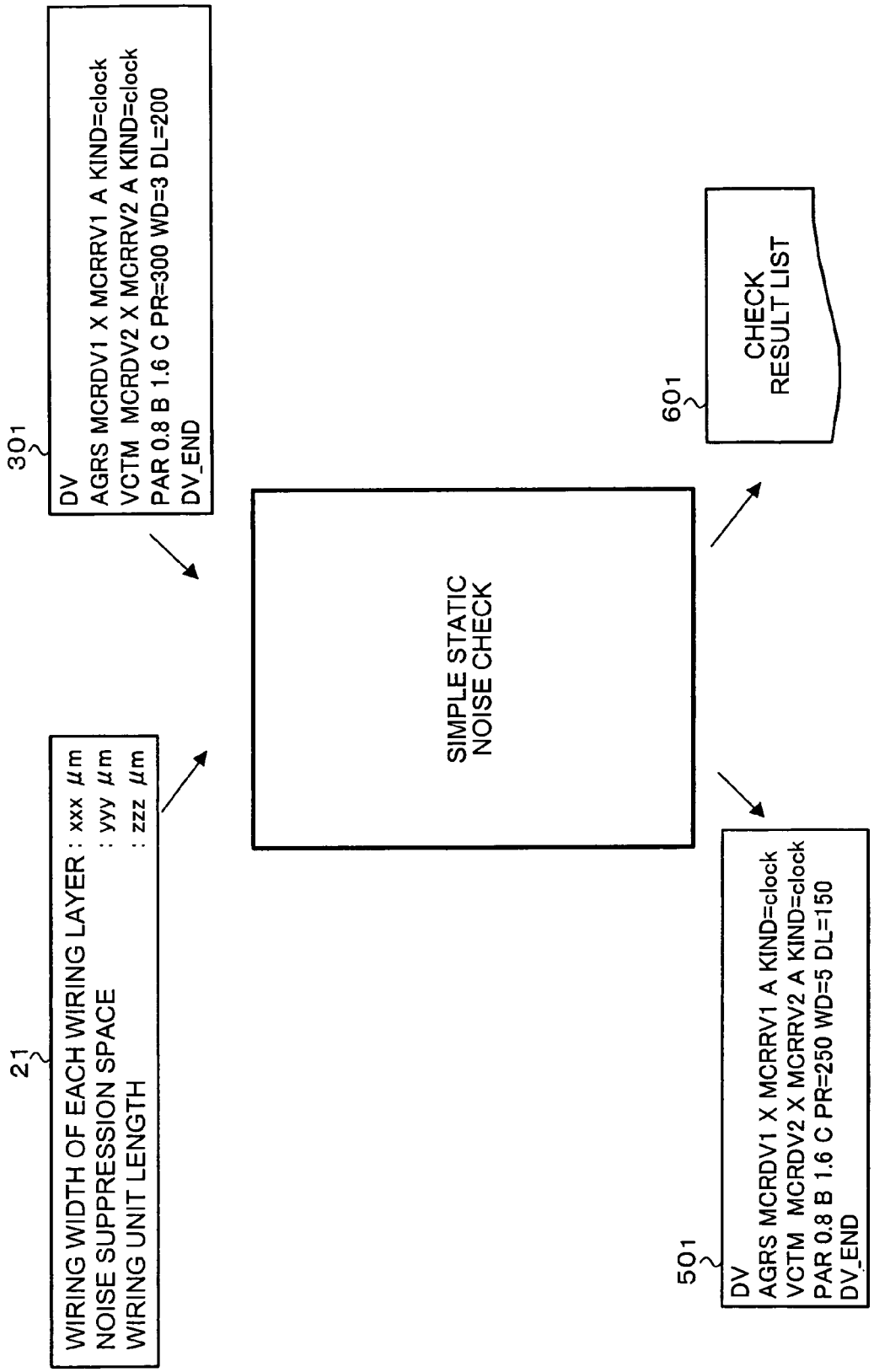

FIG.3

```
30F
DV
 AGRS DRIVER MACRO NAME   DRIVER PIN NAME   RECEIVER MACRO NAME   RECEIVER PIN NAME   KIND=NET TYPE
 VCTM DRIVER MACRO NAME   DRIVER PIN NAME   RECEIVER MACRO NAME   RECEIVER PIN NAME   KIND=NET TYPE
 PAR   WIRING WIDTH OF aggressor NET (μm)  WIRING LAYERS OF aggressor NET  WIRING WIDTH OF victim NET (μm)
       WIRING LAYERS OF victim NET   PARALLEL SECTION LENGTH PR (μm)
       PARALLEL SECTION ADJOINING DISTANCE WD (μm)  DRIVER PARALLEL SECTION DISTANCE DL (μm)
DV_END
DV
  ..
DV_END
DV
  ..
DV_END
```

AGRS MCRDV1 X MCRRV1 A KIND=clock

VCTM MCRDV2 X MCRRV2 A KIND=clock

PAR 0.8 B 1.6 C PR=300 WD=3 DL=200

DV_END

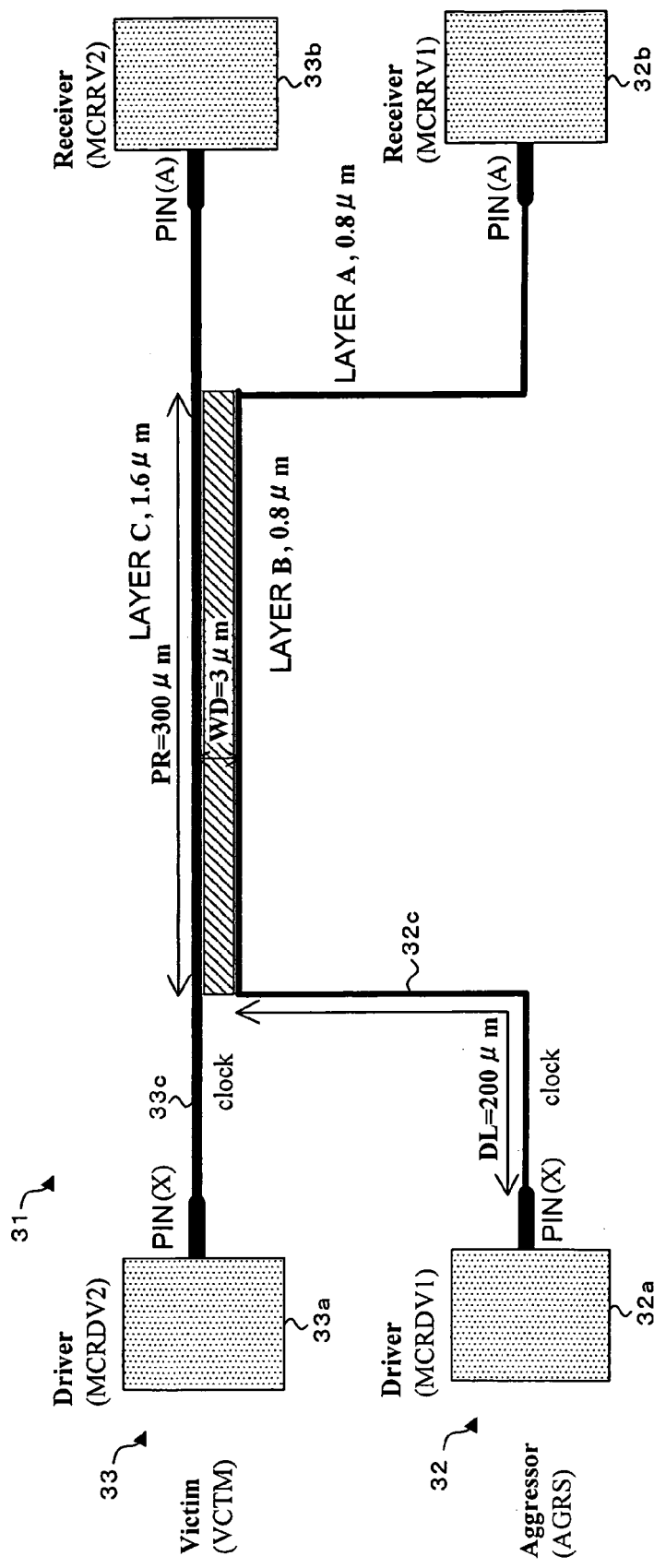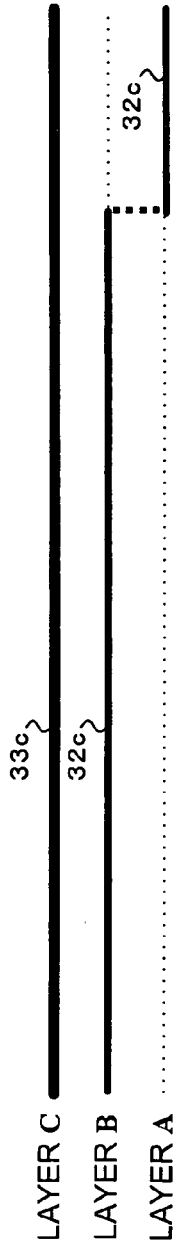

```
DV
AGRS MCRDV1 X MCRRV1 A KIND=clock
VCTM  MCRDV2 X MCRRV2 A KIND=clock
PAR 0.8 B 1.6 C PR=300 WD=3 DL=500
PAR 1.6 C 1.6 C PR=200 WD=5 DL=1000
DV_END
```

```
DV
AGRS   MCRDV1 X MCRRV1 A KIND=signal2
AGRS2 MCRDV3 X MCRRV3 A KIND=signal3
VCTM  MCRDV2 X MCRRV2 A KIND=signal4
PAR   1.6 C 1.6 C 200 4 DL=300
PAR   0.8 B 1.6 C 300 2 DL=200
DV_END
```

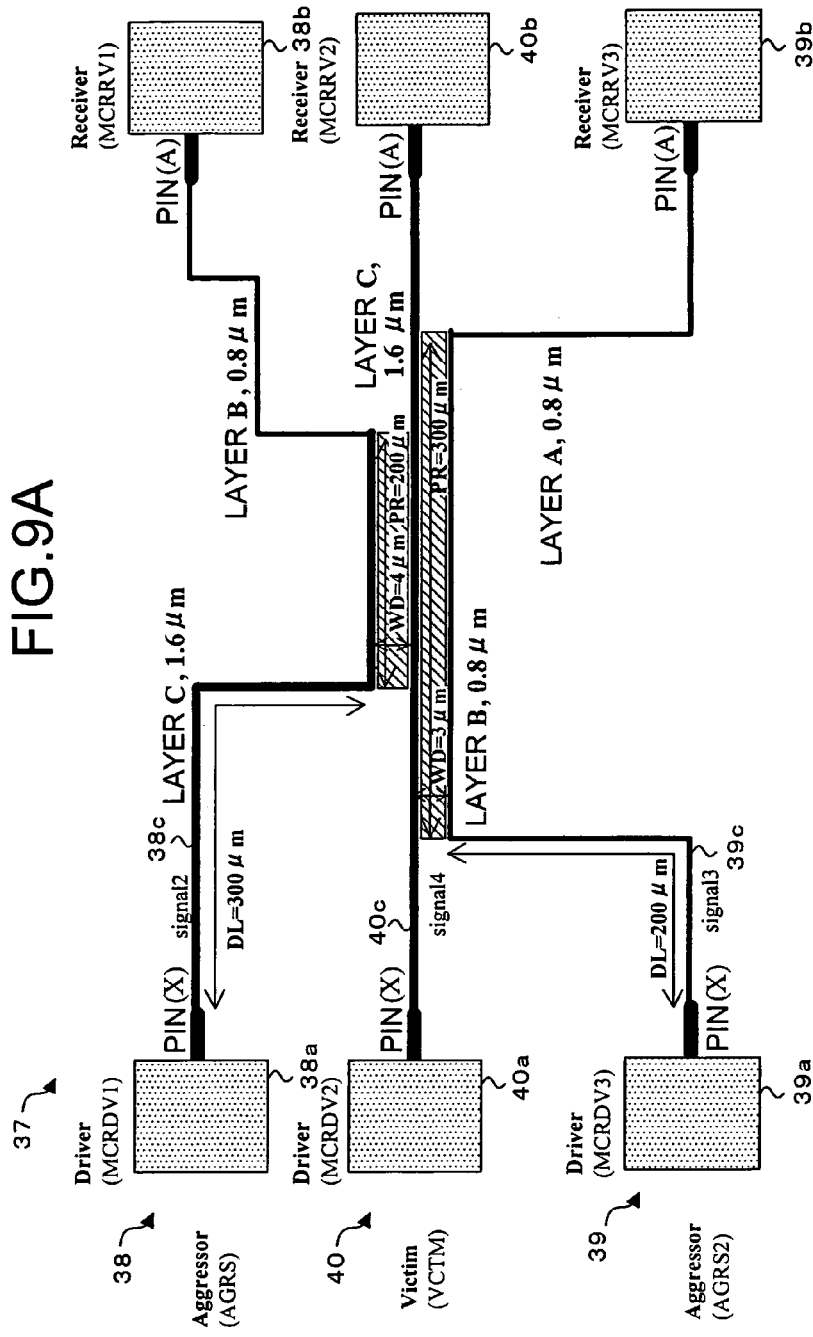
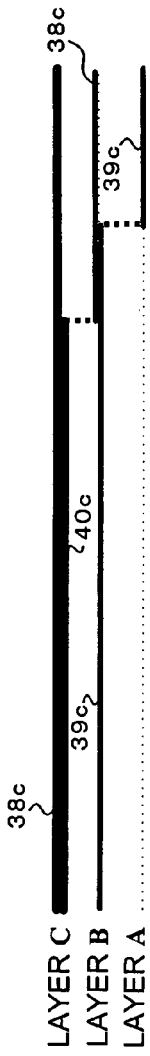
FIG. 9A
FIG. 9B

FIG.10

```
****** Static Noise 1:1 Check Error List ******  (YY/MM/DD  HH:MM:SS)

1:1 Check Ratio : 100 % (align here)    <--   1:1 CHECK PERCENTAGE
Input file      : input_wire_info        <--   WIRING DATA FILE NAME
Input Tech file : input_tech_info        <--   TECHNOLOGY DATA FILE NAME
=========================================================================
NET Name   : net_dir1/signal1    : SIGNAL       *Lx1 = 0.23280     PAR
               ↑                    ↑                  ↑            ↑
          victim NET NAME       victim NET TYPE    LIMITING     PARALLEL
                                                   VALUE OF 1:1  SECTION LENGTH : net_dir1/signal2    : SIGNAL        Nv = 0.34724     1840
               ↑                    ↑                  ↑            ↑
          aggressor NET NAME  aggressor NET TYPE  NOISE OF 1:1   PARALLEL
                                                                SECTION LENGTH
```

```
****** Static Noise 1:2 Check Error List ******    (YY/MM/DD  HH:MM:SS)
==============================================================================

1:2 Check Ratio : 100 %              <-- 1:2 CHECK PERCENTAGE
Input file      : input_wire_info    <-- WIRING DATA FILE NAME
Input Tech file : input_tech_info    <-- TECHNOLOGY DATA FILE NAME
==============================================================================

NET Name   : net_dir1/signal1  : SIGNAL         *Lx2 = 0.23280    PAR
              ↑                   ↑                  ↑             ↑
           victim NET NAME     victim NET TYPE    LIMITING      PARALLEL
                                                  VALUE OF 1:2  SECTION LENGTH : net_dir1/signal2  : SIGNAL                           570
           : net_dir1/signal3  : SIGNAL         Nv = 0.44724      960
              ↑                   ↑                  ↑
aggressor 1,2 NET NAME    aggressor 1,2 NET TYPE  NOISE OF 1:2
------------------------------------------------------------------------------
```

METHOD AND DEVICE FOR ELECTRONIC CIRCUIT DESIGNING, AND COMPUTER PRODUCT

This application is a continuing application, filed under 35 U.S.C. §111(a), of International Application PCT/JP2003/014072, filed Nov. 4, 2003.

BACKGROUND OF THE INVENTION

1. Field of the Invention

The present invention relates to a method and a device for electronic circuit design and a computer product that enable to reduce the circuit design time.

2. Description of the Related Art

Recently, due to miniaturization and enhancement of speed in various types of electronic circuits, noise analysis and noise suppression during electronic circuit design are becoming increasingly significant. Thus, electronic circuits are designed such that the noise is within a limiting value.

FIG. 16 is a flowchart of a conventional electronic circuit designing method as disclosed in Japanese Patent Laid-Open Publication No. 2002-259481.

Register Transfer Level (RTL) designing is carried out at step SA1. In the RTL designing, functional operations of a logic circuit are represented by using flow of data signals and control signals, to thereby design logic specifications of the electronic circuit to be designed.

The logic specifications designed at step SA1 are input at step SA2, where technology mapping, an optimization process that uses delay period, area etc. as evaluation functions, and a logic synthesis process for generating a cell (logic circuit) at gate level are executed.

A floor plan process is executed at step SA3 for determining an outline layout of each cell on a semiconductor chip. The floor plan process aims at optimizing the size and the electrical characteristics of the semiconductor chip.

At step SA4, based on the outline layout determined at step SA3, each cell is laid out on the layout surface, and the cells are wired with each other. At step SA5, signals are input into all the laid out cells, and a timing analysis is carried out to determine whether the signals are output at predetermined timing and frequency. Because all the cells are subjected to the timing analysis, several days are needed to complete the timing analysis even if a large-scale computer is used.

Whether there is any error in the timing analysis result is determined at step SA6. If the result of determination at step SA6 is "Yes", in other words, if there is an error in the timing analysis result, redesigning is carried out at step SA4 to prevent occurrence of errors, and layout and wiring of the cells are modified.

Similarly, a timing analysis after the redesigning is carried out at step SA5. Several days are further needed for the timing analysis even if the large-scale computer is used. Whether there is any error in the timing analysis result is determined at step SA6.

If an error occurs again due to a fault in the redesigning, the layout and the wiring of the cells are modified again. Thus, steps SA4 through SA6 are repeated until the result of determination at step SA6 is "No".

If there is no error in the timing analysis result and the result of determination at step SA6 is "No", a static noise check is executed at step SA7 for checking static noise (hereinafter, "noise") in each cell and the wiring that are subjected to the timing analysis.

In the static noise check, capacitance and resistance are computed according to wiring width, wiring layers and wiring length, and noise is computed based on parameters according to parallel section of the wiring and types of cells (driver, receiver etc.).

Whether the noise is within the limiting value (threshold value) is determined at step SA8. If the result of determination at step SA8 is "No", in other words, if the noise exceeds the limiting value, a redesigning is carried out at step SA4 such that the noise is within the limiting value and there is no error in the timing analysis result, thereby modifying the layout of the cells and the wiring.

Similarly, a timing analysis after the redesigning is carried out at step SA5. Several days are further needed for the timing analysis even if the large-scale computer is used. Whether there is an error in the timing analysis is determined at step SA6. If the result of determination at step SA6 is "Yes", further redesigning is carried out at step SA4 and the layout of the cells and the wiring is modified.

If the result of determination at step SA6 is "No", a static noise check after the redesigning is similarly carried out at step SA7. Whether noise after the redesigning is within the limiting value (threshold value) is determined at step SA8. If the result of determination at step SA8 is "No", in other words, if the noise exceeds the limiting value, a redesigning is carried out at step SA4 such that the noise is within the limiting value and there is no error in the timing analysis result, thereby modifying the layout of the cells and the wiring.

Steps SA4 through SA8 are repeated until the result of determination at step SA8 is "Yes". If the result of determination at step SA8 is "Yes", in other words, if there is no error in the timing analysis result and the noise is within the limiting value, manufacturing data is generated at step SA9 for manufacturing the electronic circuits to be designed, based on the layout of each cell and the wiring.

However, in the conventional electronic circuit designing method, because the redesigning pertaining to the layout of the cells and the wiring at step SA4 is carried out based on the experience and the instinct of a designer, further redesigning is often needed, thereby increasing the designing period. Moreover, in the conventional electronic circuit designing method, a large number of electronic circuits are subjected to the designing process, thereby making it difficult to ensure that noise pertaining to all the electronic circuits is within the limiting value.

As shown in FIG. 16, in the conventional electronic circuit designing method, the static noise check is executed at step SA7 after execution of the timing analysis at step SA5.

As explained above, the timing analysis takes a long time.

Further, in the conventional electronic circuit designing method, redesigning of the layout of the circuits and the wiring is carried out at step SA4 if the static noise check is not satisfactory, even if the timing analysis result is satisfactory. Thus, the time-consuming timing analysis needs to be executed again, thereby further increasing the designing period.

SUMMARY OF THE INVENTION

It is an object of the present invention to at least solve the problems in the conventional technology.

According to one aspect of the present invention, a device for electronic circuit design includes a noise controlling unit that computes noise related to a part of electronic circuits that are to be designed, and modifies a parameter of the part of the electronic circuits, if computed noise exceeds a limiting value, so that the noise is not more than the limiting value; a timing analyzing unit that analyzes a signal transmission timing for all the electronic circuits; and a static noise controlling unit that computes the noise related to all the electronic circuits whose timing is analyzed, and operates the simple noise controlling unit, if computed noise exceeds the limiting value.

According to another aspect of the present invention, a method for electronic circuit design includes noise controlling, including computing noise related to a part of electronic circuits that are to be designed, and modifying a parameter of the part of the electronic circuits, if computed noise exceeds a limiting value, so that the noise is not more than the limiting value; analyzing a signal transmission timing for all the electronic circuits; and static noise controlling, including computing the noise related to all the electronic circuits whose signal transmission timing is analyzed, and executing the act of simple noise controlling, if the noise computed during the act of static noise controlling exceeds the limiting value.

According to still another aspect of the present invention, a computer readable recording medium that records thereon a computer program for electronic circuit design, the computer program including instructions which, when executed, cause a computer to execute the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of a structure according to an embodiment of the present invention;

FIG. 2 is a schematic of an outline of a simple static noise check according to the embodiment;

FIG. 3 is a schematic of a wiring data file format 30F according to the embodiment;

FIG. 4 is a schematic of a wiring data file $30_1$ that represents a net cluster 31 shown in FIG. 5A;

FIG. 5A and FIG. 5B are schematics of the net cluster 31 according to the embodiment;

FIG. 6 is a schematic of a wiring data file $30_2$ that represents a net cluster 34 shown in FIG. 7A;

FIG. 8 is a schematic of a wiring data file $30_3$ that represents a net cluster 37 shown in FIG. 9A;

FIG. 9A and FIG. 9B are schematics of the net cluster 37 according to the embodiment;

FIG. 10 is a schematic of a check result list $60_1$ according to the embodiment;

FIG. 11 is a schematic of a check result list $60_3$ according to the embodiment;

DETAILED DESCRIPTION OF THE PREFERRED EMBODIMENTS

Figure 7:
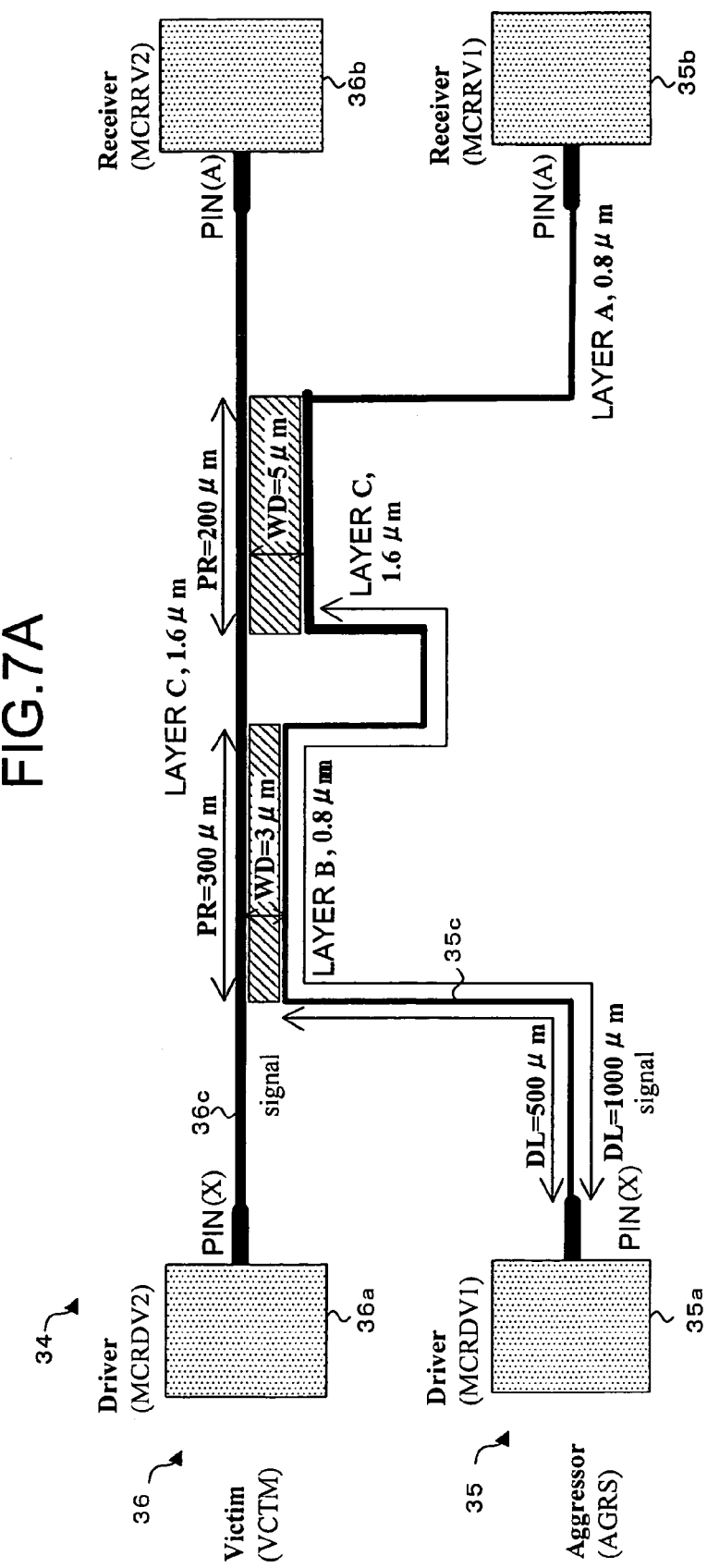
FIG. 7A and FIG. 7B are schematics of the net cluster 34 according to the embodiment.

Exemplary embodiments of the present invention are explained next in detail below, with reference to the accompanying drawings. FIG. 1 is a block diagram of a structure according to an embodiment of the present invention.

As shown in FIG. 1, an electronic circuit designing device 10 designs an electronic circuit by using Register Transfer Level (RTL) designing, logic synthesis, a floor plan process, a simple static noise check (see FIG. 2), timing analysis, a static noise check, generation of manufacturing data etc.

A controller 11 exercises control related to designing. An operation of the controller 11 is explained in detail later. A storage unit 12 stores computer programs, various types of information, and data that are used by the controller 11. An input unit 13 is a keyboard, a mouse, or an external data reading unit. An output unit 14 outputs manufacturing data to an external device. A display unit 15 is a Liquid Crystal Display (LCD) or a Cathode Ray Tube (CRT) etc.

A technology data file storage unit 20 stores a technology data file 21 shown in FIG. 2. The technology data file 21 includes technology data that defines technology characteristics necessary for the wiring that connects the cells.

The technology data includes a wiring width usable in each wiring layer, a noise suppression space (a minimum space pertaining to wiring interval to ensure noise suppression), wiring unit length, wiring layer type, wiring layer name, and a limiting value of noise.

Returning to FIG. 1, a wiring data file storage unit 30 stores a wiring data file. Based on a wiring data file format 30F shown in FIG. 3, the wiring data file defines wiring data in each net (smallest unit of an electronic circuit) that is subjected to the static noise check.

A net includes a driver (cell) of a transmitting end, a receiver (cell) of a receiving end, and wiring that connects the driver and the receiver.

If two nets are laid adjacent to each other, the wiring in a net imparts noise to the wiring in the other net in a parallel section of the two wirings. Hereinafter, a net that imparts noise is called an aggressor net, and a net that receives noise is called a victim net.

FIG. 5A is a schematic of a net cluster 31. The net cluster 31 is laid out spread over three wiring layers—layer A, layer B, and layer C shown in FIG. 5B. The net cluster 31 includes an aggressor net 32 and a victim net 33.

The aggressor net 32 includes a driver (cell) 32a, a receiver (cell) 32b, and a wiring 32c that connects the driver 32a and the receiver 32b. The aggressor net 32 imparts noise to the victim net 33. The wiring 32c is laid out spread over the layer B and the layer A that are shown in FIG. 5B, and is positioned between a pin (X) of the driver 32a and a pin (A) of the receiver 32b.

The victim net 33 shown in FIG. 5A includes a driver (cell) 33a, a receiver (cell) 33b, and a wiring 33c that connects the driver 33a and the receiver 33b. The victim net 33 receives noise from the aggressor net 32. The wiring 33c is laid out spread over the layer C that is shown in FIG. 5B, and is positioned between a pin (X) of the driver 33a and a pin (A) of the receiver 33b.

In the wiring data file format 30F shown in FIG. 3, DV indicates beginning of the wiring data, and DV_END indicates end of the wiring data. AGRS indicates data related to the aggressor net, and includes a driver macro name, a driver pin name, a receiver macro name, a receiver pin name, and KIND=net type.

The driver macro name is a name allocated to the driver. For example, the driver 32a has a driver macro name MCRDV1 (see FIG. 5A). The driver pin name is a pin name of the driver, such as the pin (X) of the driver 32a.

The receiver macro name is a name allocated to the receiver. For example, the receiver 32b has a receiver macro name MCRRV1 (see FIG. 5A). The receiver pin name is a pin name of the receiver, such as the pin (A) of the receiver 32b. KIND=net type indicates a net type (used for clock signal transmission, used for power source etc.) of the aggressor net 32, such as clock.

VCTM indicates data related to the victim net and includes a driver macro name, a driver pin name, a receiver macro name, a receiver pin name, and KIND=net type.

The driver macro name is a name allocated to the driver. For example, the driver 33a has a driver macro name MCRDV2 (see FIG. 5A). The driver pin name is a pin name of the driver, such as the pin (X) of the driver 33a.

The receiver macro name is a name allocated to the receiver. For example, the receiver 33b has a receiver macro name MCRRV2 (see FIG. 5A). The receiver pin name is a pin name of the receiver, such as the pin (A) of the receiver 33b. KIND=net type indicates a type (used for clock signal transmission, used for power source etc.) of the victim net 33 such as clock.

PAR includes data such as wiring width of the aggressor net, wiring layers of the aggressor net, wiring width of the victim net, wiring layers of the victim net, a parallel section length PR, a parallel section adjoining distance WD, and a driver parallel section distance DL.

The wiring width of the aggressor net is a width of the wiring of the aggressor net. For example, the wiring width of the wiring 32c is 0.8 µm (see FIG. 5A). The wiring layers of the aggressor net are wiring layers over which the aggressor net is laid out. For example, the wiring layer of the aggressor net 32 is the layer B.

The wiring width of the victim net is a width pertaining to the wiring of the victim net. For example, the wiring width of the wiring 33c is 1.6 µm (see FIG. 5A). The wiring layers of the victim net are the wiring layers over which the victim net is laid out. For example, the wiring layer of the victim net 33 is the layer C. The parallel section length PR is a length of a section that is parallel when the wiring of the aggressor net and the wiring of the victim net are in an abutting condition (hereinafter, "parallel section"). For example, as shown in FIG. 5A, the parallel section length PR is 300 µm.

The parallel section adjoining distance WD is the adjoining distance between wirings in the parallel section. As shown in FIG. 5A, the parallel section adjoining distance WD is 3 µm. The driver parallel section distance DL is the wiring distance between a driver of the aggressor net and the parallel section. As shown in FIG. 5A, the driver parallel section distance DL is 200 µm.

FIG. 4 is a schematic of a wiring data file $30_1$ that represents the net cluster 31 shown in FIG. 5A. The wiring data file $30_1$ corresponds to the wiring data file format 30F (see FIG. 3), and is stored in a wiring data file storage unit 30.

FIG. 6 is a schematic of a wiring data file $30_2$ that represents a net cluster 34 shown in FIG. 7A. The wiring data file $30_2$ corresponds to the wiring data file format 30F (see FIG. 3), and is stored in the wiring data file storage unit 30.

FIG. 7A is a schematic of the net cluster 34. The net cluster 34 is laid out spread over three wiring layers—layer A, layer B, and layer C shown in FIG. 7B. The net cluster 34 includes an aggressor net 35 and a victim net 36.

The aggressor net 35 includes a driver (cell) 35a, a receiver (cell) 35b, and a wiring 35c that connects the driver 35a and the receiver 35b. The aggressor net 35 imparts noise to the victim net 36. The wiring 35c is laid out spread over the layer B, the layer C, and the layer A that are shown in FIG. 7B, and is positioned between a pin (X) of the driver 35a and a pin (A) of the receiver 35b.

The victim net 36 shown in FIG. 7A includes a driver (cell) 36a, a receiver (cell) 36b, and a wiring 36c that connects the driver 36a and the receiver 36b. The victim net 36 receives noise from the aggressor net 35. The wiring 36c is laid out spread over the layer C that is shown in FIG. 7B, and is positioned between a pin (X) of the driver 36a and a pin (A) of the receiver 36b.

The wiring 36c and the wiring 35c include two parallel sections. Thus, the wiring data file $30_2$ (see FIG. 6) includes descriptions of two PAR corresponding to the two parallel sections.

FIG. 8 is a schematic of a wiring data file $30_3$ that represents a net cluster 37 shown in FIG. 9A. The wiring data file $30_3$ corresponds to the wiring data file format 30F (see FIG. 3), and is stored in the wiring data file storage unit 30.

FIG. 9A is a schematic of the net cluster 37. The net cluster 37 is laid out spread over three wiring layers—layer A, layer B, and layer C shown in FIG. 9B. The net cluster 37 includes an aggressor net 38, an aggressor net 39, and a victim net 40.

The aggressor net 38 includes a driver (cell) 38a, a receiver (cell) 38b, and a wiring 38c that connects the driver 38a and the receiver 38b. The aggressor net 38 imparts noise to the victim net 40. The wiring 38c is laid out spread over the layer C and the layer B that are shown in FIG. 9B, and is positioned between a pin (X) of the driver 38a and a pin (A) of the receiver 38b.

The aggressor net 39 includes a driver (cell) 39a, a receiver (cell) 39b, and a wiring 39c that connects the driver 39a and the receiver 39b. The aggressor net 39 imparts noise to the victim net 40. The wiring 39c is laid out spread over the layer B and the layer A that are shown in FIG. 9B, and is positioned between a pin (X) of the driver 39a and a pin (A) of the receiver 39b.

The victim net 40 shown in FIG. 9A includes a driver (cell) 40a, a receiver (cell) 40b, and a wiring 40c that connects the driver 40a and the receiver 40b. The victim net 40 receives noise from both the aggressor net 38 and the aggressor net 39. The wiring 40c is laid out spread over the layer C that is shown in FIG. 9B, and is positioned between a pin (X) of the driver 40a and a pin (A) of the receiver 40b.

The wiring 40c and the wiring 38c include a parallel section. Similarly, the wiring 40c and the wiring 39c also include a parallel section. Thus, the wiring data file $30_3$ (see FIG. 8) includes descriptions of two PAR corresponding to the two parallel sections.

In the embodiment, the simple static noise check shown in FIG. 2 is executed after all the cells and the wiring are laid out, but before executing the timing analysis.

In the simple static noise check, based on an input of the technology data file 21, the wiring data file $30_1$ corresponding to a part of the cells, the controller 11 executes a check to determine whether noise pertaining to the part of the cells is within the limiting value.

If the noise exceeds the limiting value, parameters among the parameters in the wiring data file $30_1$ such as the parallel section adjoining distance WD, the parallel section length PR etc., which are effective in noise reduction, are automatically restricted and modified such that the noise is within the limiting value.

In the simple static noise check, the wiring data file $30_1$ is input, and a wiring restriction data file $50_1$ and a check result list $60_1$ corresponding to the wiring data file $30_1$ are output.

The wiring restriction data file $50_1$ is a file in which the parallel section adjoining distance WD and the parallel section length PR from the wiring data file $30_1$ are restricted such that the noise is within the limitation value. The format of the wiring restriction data file $50_1$ is similar to the wiring data file $30_1$.

As shown in FIG. 10, the check result list $60_1$ represents a simple static noise check result obtained based on the wiring data file $30_1$. The check result list $60_1$ includes a wiring data file name, a technology data file name, a victim net name, an aggressor net name, limiting values of parameters, noise etc.

A check result list $60_3$ shown in FIG. 11 corresponds to the wiring data file $30_3$.

Returning to FIG. 1, a wiring restriction data file storage unit 50 stores the wiring restriction data file $50_1$ etc.

The operation according to the embodiment is explained next with reference to flowcharts shown in FIG. 12 through FIG. 14.

Similar to step SA1 of the conventional electronic circuit designing method, the controller 11 of the electronic circuit designing device 10 executes the RTL designing at step SB1. By using the logic specification designed at step SB1 as input, the controller 11 uses technology mapping, delay time, and area as evaluation functions to carry out an optimization process at step SB2 to execute a logic synthesis process for generating a cell (logic circuit) at gate level.

At step SB3, the controller 11 executes the floor plan process for determining an outline layout of each cell on a semiconductor chip. The floor plan process aims at optimizing the size and the electrical characteristics of the semiconductor chip.

At step SB4, the controller 11 executes the simple static noise check. Specifically, at step SC1 shown in FIG. 13, the controller 11 reads, from the wiring data file storage unit 30, that portion of the wiring data file $30_1$, for example, that corresponds to a part of the cells among all the cells, and interprets the read wiring data file $30_1$ (the wiring data file $30_2$ (see FIG. 6) and the wiring data file $30_3$ (see FIG. 8) can be similarly read). A user, for example, specifies the wiring data file $30_1$.

At step SC2, the controller 11 reads the technology data file 21 (see FIG. 2) from the technology data file storage unit 20, and interprets the technology data file 21.

At step SC3, based on the interpretations at step SC1 and step SC2, the controller 11 sorts the parameters that are used for noise computation.

At step SC4, the controller 11 computes noise ($N_V$) pertaining to the net cluster 31 (see FIG. 5) that corresponds to the wiring data file $30_1$, by substituting parameters in the following expression (1).

$$N_V = \Sigma L_n \times K_a \times K_b, f(\Sigma C, L) \times \alpha_{ag} \times \alpha_{vc} \quad (1)$$

In expression (1), $\Sigma L_n$ is a sum of parallel section lengths. $K_a$ is a coefficient pertaining to the victim net. $K_b$ is a coefficient pertaining to the aggressor net. $f(\Sigma C, L)$ is a relaxation function based on a waveform of the aggressor net due to the wiring between the driver of the aggressor net and the parallel section, and is computed from distance and capacitance.

$\alpha_{ag}$ is a driver coefficient of the aggressor net, and is determined from drive capacity of the driver. $\alpha_{vc}$ is a driver coefficient of the victim net, and is determined from drive capacity of the driver.

At step SC5, the controller 11 determines whether the noise ($N_V$) computed at step SC4 is within a predetermined limiting value. If the result of determination at step SC5 is "Yes", the controller 11 outputs the check result list $60_1$ at step SC6.

If the result of determination at step SC5 is "No", in other words, if the noise exceeds the limiting value, the controller 11 executes a wiring restriction data file generating process at step SC7.

In the wiring restriction data file generating process, parameters (for example, the parallel section length PR, the parallel section adjoining distance WD) of the wiring data file $30_1$ are modified (fine tuned) to generate the wiring restriction data file $50_1$. A first method, a second method, and a third method may be used to modify (fine tune) the parameters.

In the first method, the parallel section adjoining distance WD is increased by unit length at a time (for example, 1 μm) to reduce the noise. In the second method, the parallel section length PR is reduced by unit length at a time (for example, 1 μm) to reduce the noise. In the third method, the parallel section adjoining distance WD is increased by unit length (for example, 1 μm) and the parallel section length PR is reduced by unit length (for example, 1 μm) at a time, to reduce the noise.

In the present embodiment, apart from the first through the third methods, a method to reduce the wiring width of the aggressor net, a method to reduce the drive capacity pertaining to the driver of the victim net, a method to reduce the drive capacity pertaining to the driver of the aggressor net, a method to reduce the parallel section distance DL, and a method that combines the aforementioned methods can also be applied to reduce the noise.

Figure 13:
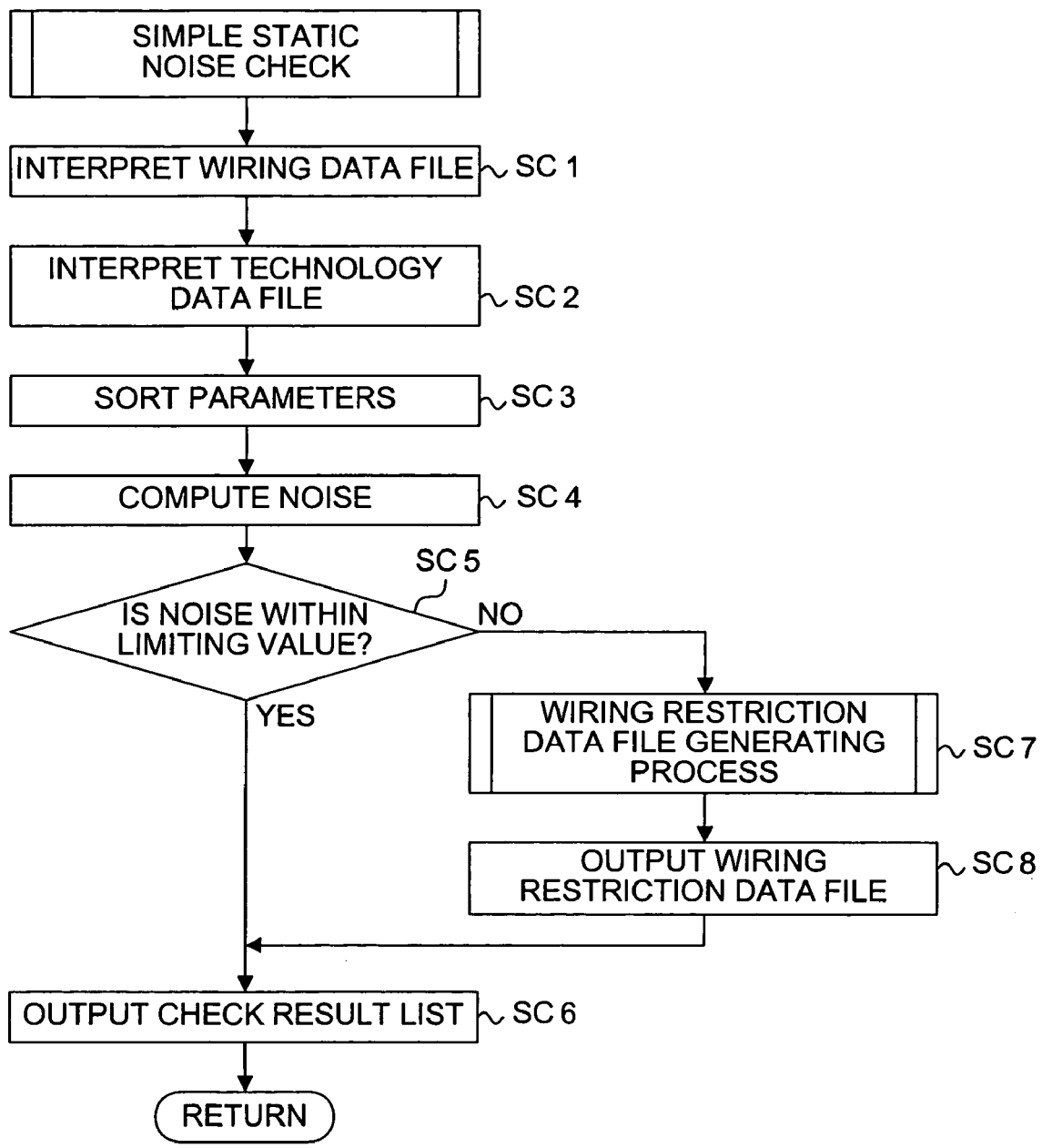
FIG. 13 is a flowchart of a simple static noise checking process shown in FIG. 12.
Figure 14:
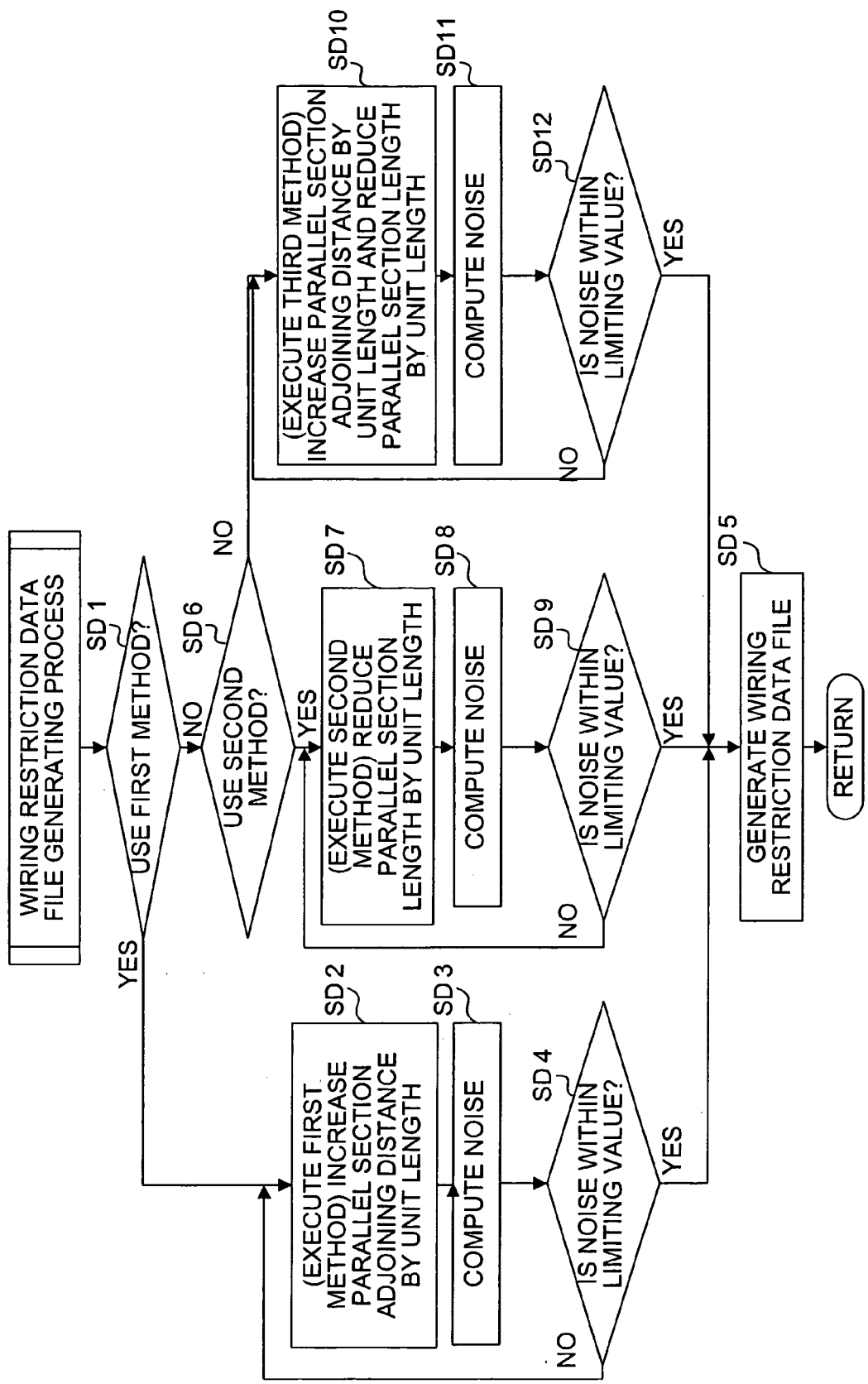
FIG. 14 is a flowchart of a wiring restriction data file generating process shown in FIG. 13.

As shown in FIG. 14, at step SD1 in the wiring restriction data file generating process, the controller 11 determines whether the user has priorly set the first method. If the result of determination at step SD1 is "Yes", the controller 11 executes the first method at step SD2 to increase the parallel section adjoining distance WD in the wiring data file $30_1$ by unit length. At step SD3, similar to step SC4 of FIG. 13, the controller 11 computes the noise based on the parallel section adjoining distance WD after modification.

At step SD4, the controller 11 determines whether the noise computed at step SD3 is within the predetermined limiting value. If the result of determination at step SD4 is "No", the controller 11 further increases the parallel section adjoining distance WD by unit length in the wiring data file $30_1$, at step SD2. Similar to step SC4 of FIG. 13, based on the parallel section adjoining distance WD after modification, the controller 11 computes the noise at step SD3.

Steps SD2 through SD4 are repeated until the result of determination at step SD4 is "Yes".

If the result of determination at step SD4 is "Yes", at step SD5, the controller 11 generates the wiring restriction data file $50_1$ corresponding to the wiring data file $30_1$ after modification.

Returning to step SC8 of FIG. 13, the controller 11 outputs the wiring restriction data file $50_1$, and stores the wiring restriction data file $50_1$ in the wiring restriction data file storage unit 50. The controller 11 outputs the check result list $60_1$ at step SC6.

If the result of determination at step SD1 of FIG. 14 is "No", the controller 11 determines at step SD6 whether the user has priorly set the second method.

If the result of determination at step SD6 is "Yes", the controller 11 executes the second method at step SD7 to reduce the parallel section length PR in the wiring data file $30_1$ by unit length. At step SD8, similar to step SC4, the controller 11 computes the noise based on the parallel section length PR after modification.

The controller 11 determines at step SD9 if the noise computed at step SD8 is within the predetermined limiting value. If the result of determination at step SD9 is "No", at step SD7, the controller 11 further reduces the parallel section length PR by unit length in the wiring data file $30_1$. Based on the parallel section length PR after modification, the controller 11 computes the noise at step SD8.

Steps SD7 through SD9 are repeated until the result of determination at step SD9 is "Yes".

If the result of determination at step SD9 is "Yes", at step SD5, the controller 11 generates the wiring restriction data file $50_1$ corresponding to the wiring data file $30_1$ after modification.

Returning to FIG. 13, the controller 11 outputs the wiring restriction data file $50_1$ at step SC8, and stores the wiring restriction data file $50_1$ in the wiring restriction data file storage unit 50. The controller 11 outputs the check result list $60_1$ at step SC6.

If the result of determination at step SD6 of FIG. 14 is "No" and the user has priorly set the third method, the controller 11 executes the third method at step SD10 to increase the parallel section adjoining distance WD by unit length and to reduce the parallel section length PR by unit length. Similar to step SC4, based on the parallel section adjoining distance WD and the parallel section length PR after modification, the controller 11 computes the noise at step SD11.

At step SD12, the controller 11 determines whether the noise computed at step SD11 is within the predetermined value. If the result of determination at step SD12 is "No", the controller 11 further increases the parallel section adjoining distance WD by unit length, and further reduces the parallel section length PR by unit length in the wiring data file $30_1$ at step SD10. Based on the parallel section adjoining distance WD and the parallel section length PR after modification, the controller 11 computes the noise at step SD11.

Steps SD10 through SD12 are repeated until the result of determination at step SD12 is "Yes".

If the result of determination at step SD12 is "Yes", the controller 11 generates, at step SD5, the wiring restriction data file $50_1$ corresponding to the wiring data file $30_1$ after modification.

Returning to FIG. 13, the controller 11 outputs the wiring restriction data file $50_1$ at step SC8, and stores the wiring restriction data file $50_1$ in the wiring restriction data file storage unit 50. The controller 11 outputs the check result list $60_1$ at step SC6.

Returning to FIG. 12, at step SB5, based on the outline layout determined at step SB3 and the wiring data file $30_1$ (the wiring restriction data file $50_1$) generated at step SB4, each cell is laid out on the layout surface and cells are wired with each other.

At step SB6, signals are input into all the cells that are laid out, and timing analysis is carried out to determine whether the signals are output at predetermined timing and frequency. Because all the cells are subjected to the timing analysis, several days are needed to complete the timing analysis even if the large scale computer is used.

Whether there is an error in the timing analysis result is determined at step SB7. If the result of determination at step SB7 is "Yes", in other words, if there is an error in the timing analysis result, a redesigning is carried out at step SB5 to prevent occurrence of errors, and the layout and the wiring of the cells are modified.

Timing analysis after the redesigning is carried out again at step SB6. Several days are further needed for the timing analysis even if the large scale computer is used. Whether there is an error in the timing analysis is determined at step SB7.

If an error occurs again due to a fault in the redesigning, the layout and the wiring of the cells are modified again at step SB5. Thus, steps SB5 through SB7 are repeated until the result of determination at step SB7 is "No".

If there is no error in the timing analysis result and the result of determination at step SB7 is "No", the static noise check is executed at step SB8 for checking static noise (hereinafter, "noise") in each cell and the wiring that are subjected to the timing analysis.

Because the simple static noise check is already executed at step SB4, the noise at this level is less than the noise at the same level in the conventional electronic circuit designing method.

The static noise check executed at step SB8 is similar to step SC4 of FIG. 13, however, at step SB8, all the wiring data files (all the cells) are subjected to the static noise check and the noise is computed.

Whether the noise is within the limiting value (threshold value) is determined at step SB9. If the result of determination at step SB9 is "No", in other words, if the noise exceeds the limiting value, a part of the wiring data files are subjected to the simple static noise check at step SB4.

Steps SB4 through SB9 are repeated until the result of determination at step SB9 is "Yes".

If the result of determination at step SB9 is "Yes", in other words, if there is no error in the timing analysis result and the noise is within the limiting value, based on the layout of each cell and the wiring, manufacturing data is generated at step SB10 for manufacturing the electronic circuits that are designed.

Figure 12:
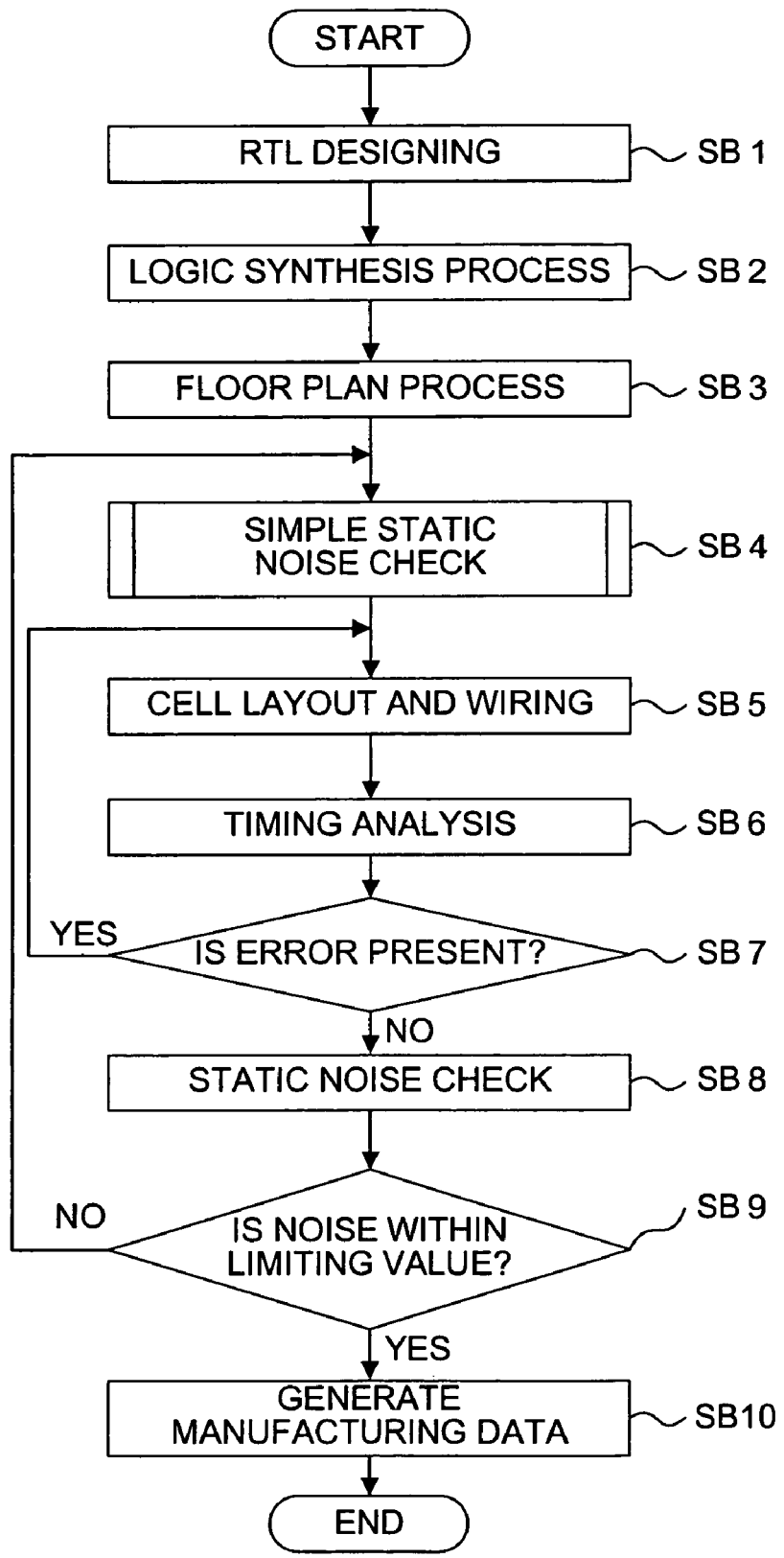
FIG. 12 is a flowchart of an operation according to the embodiment.

In the embodiment, among the electronic circuits (cells) that are designed, noise related to a part of the electronic circuits is computed at step SB4 of FIG. 12. If the noise exceeds the limiting value, parameters of the electronic circuits are modified using predetermined methods such that the noise is within the limiting value. A timing pertaining to signal transmission is analyzed at step SB6, noise related to all the electronic circuits is computed at step SB8, and if the noise exceeds the limiting value at step SB9, step SB4 (noise computation pertaining to a part of the electronic circuits and modification of the parameters) is executed, thereby enabling to reduce the designing time.

The embodiment according to the present invention is explained with reference to the accompanying drawings However, the present invention is not to be thus limited, and includes all modifications and alternative constructions that fairly fall within the basic teaching herein set forth.

Figure 15:
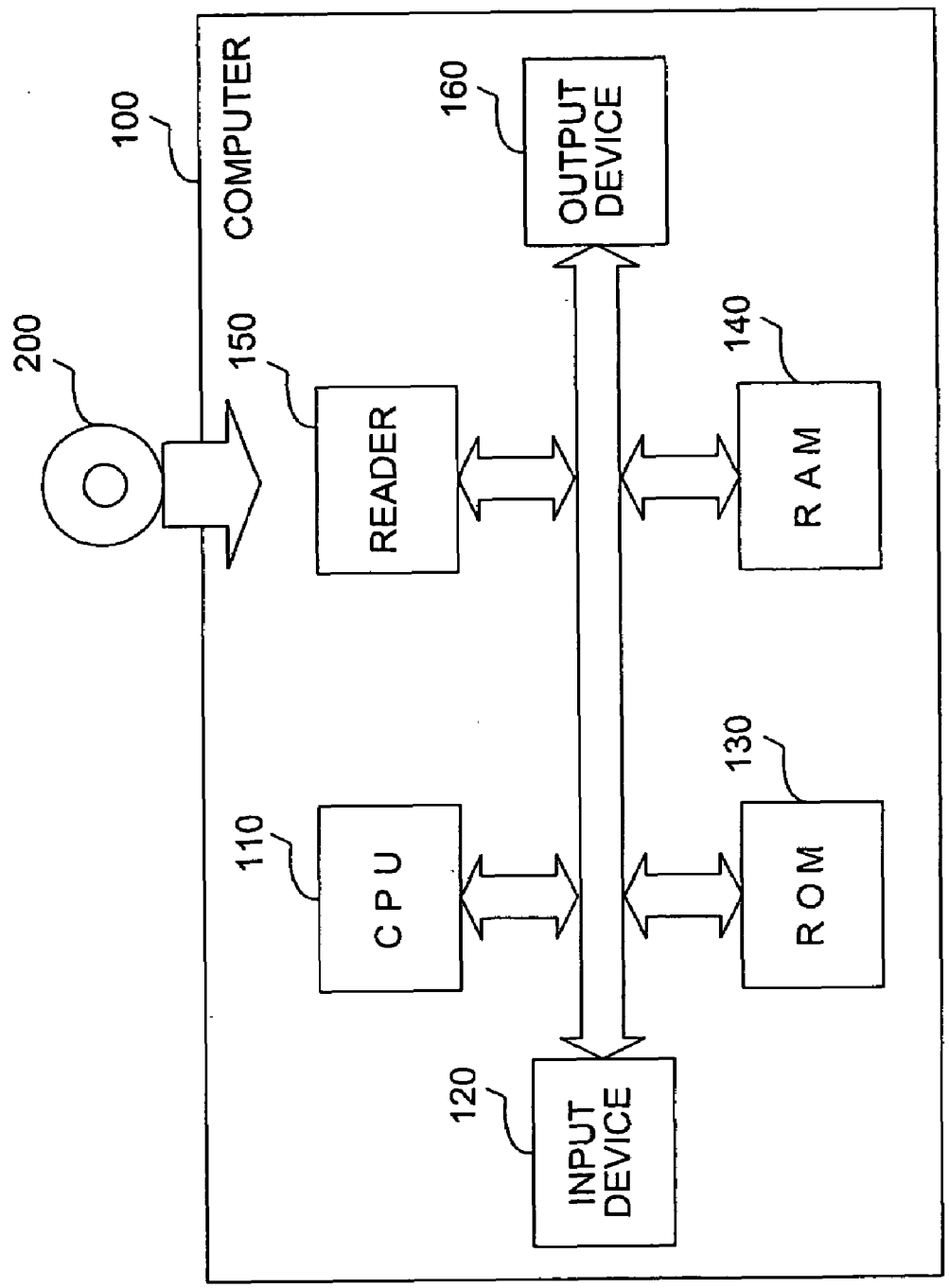
FIG. 15 is a schematic of a structure according to a modification of the embodiment.
Figure 16:
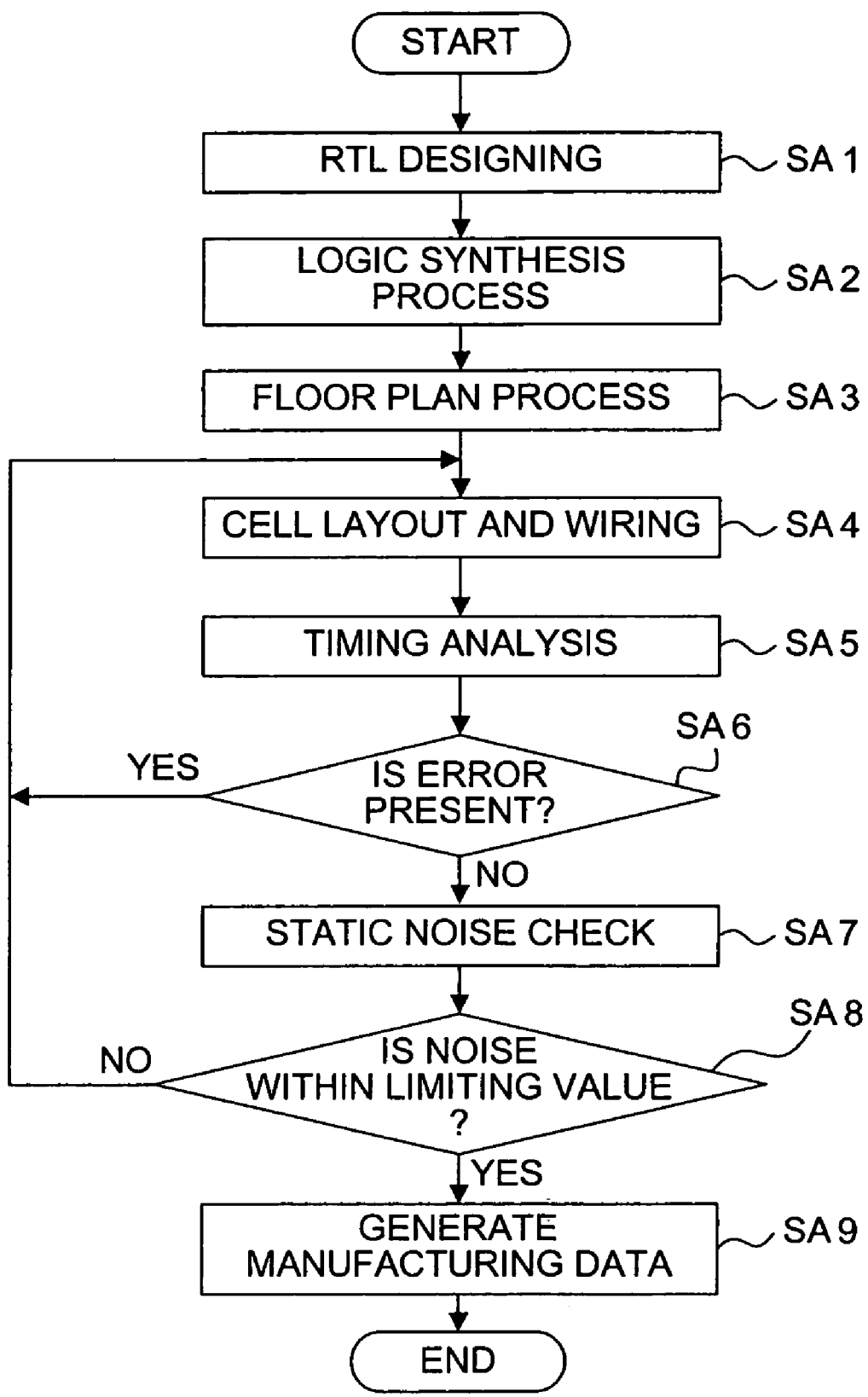
FIG. 16 is a flowchart of a conventional electronic circuit designing method.

For example, a program for realizing all the functions according to the embodiment can be stored in a computer readable recording medium 200 shown in FIG. 15. All the functions can be realized by causing a computer 100 to read the program stored in the recording medium 200 and to execute the read program.

The computer 100 includes a Central Processing Unit (CPU) 110 that executes the program, an input device 120 such as a keyboard or a mouse, a Read Only Memory (ROM) 130 that stores various types of data, a Random Access Memory (RAM) 140 that stores computation parameters etc., a reader 150 that reads the program from the recording medium 200, and an output device 160 such as a display, a printer etc.

The CPU 110 reads the program that is stored in the recording medium 200 via the reader 150 and executes the read program to realize the aforementioned functions. An optical disk, a Flexible Disk (FD), a Hard Disk (HD) can be used as the recording medium 200.

Thus, according to the present invention, among the electronic circuits (cells) that are designed, noise related to a part of the electronic circuits is computed. If the noise exceeds the limiting value, parameters of the electronic circuits are modified using predetermined methods such that the noise is within the limiting value, a timing pertaining to signal transmission is analyzed, noise related to all the electronic circuits is computed, and if the noise exceeds the limiting value, noise computation pertaining to a part of the electronic circuits and modification of the parameters is carried out, thereby enabling to reduce the designing period.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer readable recording medium that records thereon a computer program for electronic circuit design, the computer program including instructions which, when executed, cause a computer to execute:
   creating a simple static noise check model including a target net and at least an adjacent net based on wire characteristics information and wiring information input for electronic circuits, the net including a driving cell of a transmitting end, a receiving cell of a receiving end, and a wiring which connects the cells, the wire characteristics information defining wire characteristics necessary for the wiring, and the wiring information defining the wiring;
   computing noise by using the simple static noise check model; and
   modifying the wiring information, if computed noise exceeds a limiting value, so that the noise is not more than the limiting value;
   outputting the computed noise and the modified wiring information.

2. The computer readable recording medium according to claim 1, wherein the wire characteristics information and the wiring information are input or output for the electronic circuits in a text format.

3. The recording medium according to claim 1, wherein the modifying includes modifying the wiring information to reduce a length of a parallel section of adjacent wiring in the electronic circuits.

4. The recording medium according to claim 1, wherein the modifying includes modifying the wiring information to increase a distance between parallel sections of adjacent wiring in the electronic circuits.

5. The recording medium according to claim 1, wherein the modifying includes modifying the wiring information to narrow a wiring width in the electronic circuits.

6. The recording medium according to claim 1, wherein the modifying includes modifying the wiring information to reduce a drive capacity of drivers in the electronic circuits.

7. The recording medium according to claim 1, wherein the modifying includes modifying the wiring information to reduce a distance between drivers in the electronic circuits and a parallel section of adjacent wiring.

8. A method for electronic circuit design, comprising:
   creating a simple static noise check model including a target net and at least an adjacent net based on wire characteristics information and wiring information input for electronic circuits, the net including a driving cell of a transmitting end, a receiving cell of a receiving end, and a wiring which connects the cells, the wire characteristics information defining wire characteristics necessary for the wiring, and the wiring information defining the wiring;
   computing noise by using the simple static noise check model; and
   modifying the wiring information, if computed noise exceeds a limiting value, so that the noise is not more than the limiting value;
   outputting the computed noise and the modified wiring information.

9. The method for electronic circuit design according to claim 8, wherein the wire characteristics information and the wiring information are input or output for the electronic circuits in a text format.

10. The method according to claim 8, wherein the modifying includes modifying the wiring information to reduce a length of a parallel section of adjacent wiring in the electronic circuits.

11. The method according to claim 8, wherein the modifying includes modifying the wiring information to increase a distance between parallel sections of adjacent wiring in the electronic circuits.

12. The method according to claim 8, wherein the modifying includes modifying the wiring information to narrow a wiring width in the electronic circuits.

13. The method according to claim 8, wherein the modifying includes modifying the wiring information to reduce a drive capacity of drivers in the electronic circuits.

14. The method according to claim 8, wherein the modifying includes modifying the wiring information to reduce a distance between drivers in the electronic circuits and a parallel section of adjacent wiring.

15. A device for electronic circuit design, comprising:
   a simple static noise check model creating unit that creates a simple static noise check model including a target net and at least an adjacent net based on wire characteristics information and wiring information input for electronic circuits, the net including a driving cell of a transmitting end, a receiving cell of a receiving end, and a wiring which connects the cells, the wire characteristics information defining wire characteristics necessary for the wiring, and the wiring information defining the wiring;
   a noise computing unit that computes noise by using the simple static noise check model and
   a wiring information modifying unit that modifies the wiring information, if computed noise exceeds a limiting value, so that the noise is not more than the limiting value;
   an outputting unit that outputs the computed noise and the modified wiring information.

16. The device for electronic circuit design according to claim 15, wherein the wire characteristics information and the wiring information are input or output for the electronic circuits in a text format.

17. The device according to claim 15, wherein the wiring information modifying unit modifies the wiring information to reduce a length of a parallel section of adjacent wiring in the electronic circuits.

18. The device according to claim 15, wherein the wiring information modifying unit modifies the wiring information to increase a distance between parallel sections of adjacent wiring in the electronic circuits.

19. The device according to claim 15, wherein the wiring information modifying unit modifies the wiring information to narrow a wiring width in the electronic circuits.

20. The device according to claim 15, wherein the wiring information modifying unit modifies the wiring information to reduce a drive capacity of drivers in the electronic circuits.

21. The device according to claim 15, wherein the wiring information modifying unit modifies the wiring information to reduce a distance between drivers in the electronic circuits and a parallel section of adjacent wiring.

* * * * *